United States Patent
Singh

(10) Patent No.: US 10,380,686 B2
(45) Date of Patent: Aug. 13, 2019

(54) METHOD AND APPARATUS FOR PUBLISHING MARKET INFORMATION

(71) Applicant: Chicago Mercantile Exchange Inc., Chicago, IL (US)

(72) Inventor: Inderdeep Singh, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 1112 days.

(21) Appl. No.: 14/315,638

(22) Filed: Jun. 26, 2014

(65) Prior Publication Data

US 2014/0310149 A1 Oct. 16, 2014

Related U.S. Application Data

(63) Continuation-in-part of application No. 13/355,092, filed on Jan. 20, 2012.

(60) Provisional application No. 61/579,811, filed on Dec. 23, 2011.

(51) Int. Cl.
*G06Q 40/04* (2012.01)
*G06Q 40/06* (2012.01)

(52) U.S. Cl.
CPC .............. *G06Q 40/04* (2013.01); *G06Q 40/06* (2013.01)

(58) Field of Classification Search
CPC ........ G06Q 40/04; G06Q 40/06; G06Q 40/00; G06Q 30/06
See application file for complete search history.

(56) References Cited

U.S. PATENT DOCUMENTS

| | | |
|---|---|---|
| 7,194,468 B1 | 3/2007 | Bacila et al. |
| 7,552,077 B1 | 6/2009 | Schluetter et al. |
| 7,567,930 B1 | 7/2009 | Schluetter et al. |
| 7,624,063 B1 | 11/2009 | Andrews |
| 7,685,049 B1 | 3/2010 | Singer |
| 7,747,513 B2 | 6/2010 | Duquette et al. |
| 7,783,558 B1 | 8/2010 | Schwarz et al. |
| 9,639,895 B2 | 5/2017 | Callaway et al. |
| 2003/0043764 A1* | 3/2003 | Kim .................... H04L 1/0003 370/329 |
| 2003/0200284 A1* | 10/2003 | Philbrick ............... H04L 69/16 709/219 |

(Continued)

FOREIGN PATENT DOCUMENTS

EP    2811679 A1 * 12/2014 ........... H04L 1/1685

OTHER PUBLICATIONS

Petros Nicopolitidis and Georgios Papadimitriou, "Exploiting Locality of Demand to Improve the Performance of Wireless Data Broadcasting," IEEE Transaction on Vehicular Technology, vol. 55, No. 4, pp. 1347-1361 (Jul. 2006).*

(Continued)

*Primary Examiner* — Virpi H Kanervo

(74) *Attorney, Agent, or Firm* — Lempia Summerfield Katz LLC

(57) ABSTRACT

A method and apparatus for publishing market data for a financial instrument utilizes existing network layer acknowledgement feature to publish market data for the financial instrument to a client device at rates in which the client device is able to process the data. The publishing rate is dynamic, as opposed to being fixed, and is able to adjust "on-the-fly" so as to prevent message queue stagnation.

24 Claims, 6 Drawing Sheets

(56) References Cited

U.S. PATENT DOCUMENTS

| | | | |
|---|---|---|---|
| 2008/0025298 A1* | 1/2008 | Lev-Ran | H04L 69/04 |
| | | | 370/389 |
| 2008/0077653 A1 | 3/2008 | Morris | |
| 2008/0097887 A1* | 4/2008 | Duquette | G06Q 30/06 |
| | | | 705/37 |
| 2009/0327545 A1 | 12/2009 | Litovtchenko et al. | |
| 2011/0270732 A1 | 11/2011 | Ritter et al. | |
| 2013/0006841 A1 | 1/2013 | Singer | |
| 2013/0166427 A1 | 6/2013 | Singh | |

OTHER PUBLICATIONS

Lockwood, et al., "A Low-Latency Library in FPGA Hardware for High-Frequency Trading (HFT)", 2012 IEEE 20th Annual Symposium on High-Performance Interconnects, 2012, 8 pages.

Wikipedia, "TCP Congestion—Avoidance Algorithm", http://en.wikipedia.org/wiki/TCP_congestion-avoidance_algorithm, accessed Apr. 16, 2014, 6 pages.

European Search Report, from EP Application No. 15173793.9, dated Nov. 17, 2015, EP.

Rosenband, "A Remote Procedure Call Library", retrieved from the internet: http://web.mit.edu/6.033/1997/reports, retrieved Feb. 11, 2009.

* cited by examiner

METHOD AND APPARATUS FOR PUBLISHING MARKET INFORMATION

REFERENCE TO RELATED APPLICATIONS

This application is a continuation-in-part under 37 C.F.R. § 1.53(b) of U.S. patent application Ser. No. 13/355,092, filed Jan. 20, 2012 now U.S. Pat. No. 10,074,136, the entire disclosure of which is hereby incorporated by reference, which claims the benefit of the filing date under 35 U.S.C. § 119(e) of U.S. Provisional Application Ser. No. 61/579,811 filed Dec. 23, 2011, which is hereby incorporated by reference.

FIELD OF THE INVENTION

The present invention is generally directed to trading of financial instruments. More particularly, the invention is directed to a method and apparatus for facilitating the trading of a financial instrument by publishing market information to a receiving device at a rate commensurate with the rate at which the receiving device can process the market information.

BACKGROUND OF THE INVENTION

In the high stakes world of electronic trading, a well-informed trader is more likely to be a profitable trader. Traders in electronic markets depend on accurate and current market information in order to make informed trading decisions. This is especially true for traders who engage in high-frequency algorithmic trading where market opportunities can be extremely brief.

Market information is typically delivered or communicated to the trader by subscribing to one or more markets, i.e. market data feeds. For example, a trader may subscribe to receive live market information and updates for equities traded on the NYSE. The CME also provides market data on a subscription basis to traders interested in futures. Regardless of the source, the ability of the exchange to provide accurate and current market data to the trader's client device is vital to maintaining a profitable trading strategy.

Market information typically includes the current Best Bid and Best Ask (sometimes referred to as the inside market). Market depth, which generally includes Bid and Ask quantities at varying price levels that are available in the market, may also be included in the market information available from the exchanges. Market depth can be any number of price levels deep and is typically limited to some extent by the exchange in order to accommodate bandwidth issues. Market depth and pricing are not the only types of market information offered by exchanges. Exchanges may offer a wide variety of other market information types, including last traded price, last traded quantity, net change, and total volume.

Market information data feeds can contain an enormous amount of data. This is especially true in markets having a high level of liquidity where changes to the order book can occur at a high rate. While traders generally benefit from receiving as much information as possible, network limitations on the trader's end can cause the processing capacity of the trader's system to be overwhelmed and unable to properly process massive amounts of market information updates.

Measures have been taken to address the issue, but each suffers from drawbacks. In one approach, the most current market data is always sent to the trader/client device at a predetermined time interval. While this approach generally does well in keeping the market data pipeline from becoming clogged, it is inflexible and often prevents market data from being delivered to the trader in a timely manner. If a market update is sent by the exchange at the beginning of the time interval, the trader is forced to wait until the end of the time interval before receiving the new market information.

Another approach is to send a market update to the trader client each time there is a change to a market data parameter, such as a change to the inside market or the book depth. While this approach provides a quicker response to market changes, problems arise when market changes occur rapidly. As the amount of incoming market data surpasses the trader's network bandwidth, market updates are queued and published in a first in, first out manner. As the queue grows, so too does the latency of the market data being published to the trader client.

What is needed, therefore, is a more effective way to publish market information to a trader's client device.

SUMMARY OF THE INVENTION

The present invention can be summarized as a computer-implemented method for publishing market information, or otherwise transmitting, or causing transmission of, market data, that is received by an intermediary network device from a financial market center relating to a financial instrument, to a client device over an electronic network. The network device receives a market information feed from the market center that contains current market information for the financial instrument. The current market information received from the market information feed is stored and an electronic communication link, such as a TCP link, is established between a network device and a client device. The electronic communication link is configured to provide a feedback signal or other form of acknowledgement to the network device to inform the network device that the client device has successfully received data previously transmitted thereto and which is therefore indicative of when the client device is ready to receive further additional/new market information. Market information is published to the client device when the feedback signal indicates the client device is ready to receive market information.

While the disclosed embodiments will be described with respect to the delivery of market data, it will be appreciated that the disclosed embodiments may be utilized with other real time or non-real time data which may change/update subsequent to its creation/transmission such as real time sports data, live video feeds, real time sensor data, telemetry data, and the like.

The above method operates to ensure that no market information is published to the client device unless the client device is able to process it. This results in a situation where, if the client device is not ready to receive further market information, multiple market updates may be received between publishings In one embodiment of the method, only the most current/recent market information update is published to the client device.

In a further aspect of the method, an indicator is set to indicate when a market update has been stored and is ready to be published. When both the feedback signal indicates the client device is ready to receive market information and the indicator of a market update is set, the current market information is published to the client device.

Market information may be stored in the form of a market book representing offers to buy and offers to sell the financial instrument at a plurality of prices. In this embodiment, when current market information is published to the client device, the entire market book is preferably published.

The present invention also provides an apparatus for publishing market information in accordance with the above described method.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawing (which are not to scale) where:

DETAILED DESCRIPTION OF THE DRAWINGS AND PRESENTLY PREFERRED EMBODIMENTS

A need in the art is fulfilled as described herein whereby market data for one or more tradable financial instruments is published to a trader in a manner that prevents the trader's client device from being overwhelmed with, and unable to adequately process, market data, even in highly liquid/rapidly changing markets. Publishing of market data according to a method implemented within a computing system, or otherwise a computer implemented method, as described below may also reduce, minimize or otherwise eliminate latency by ensuring that the market data being processed by the client device is current.

Figure 1:
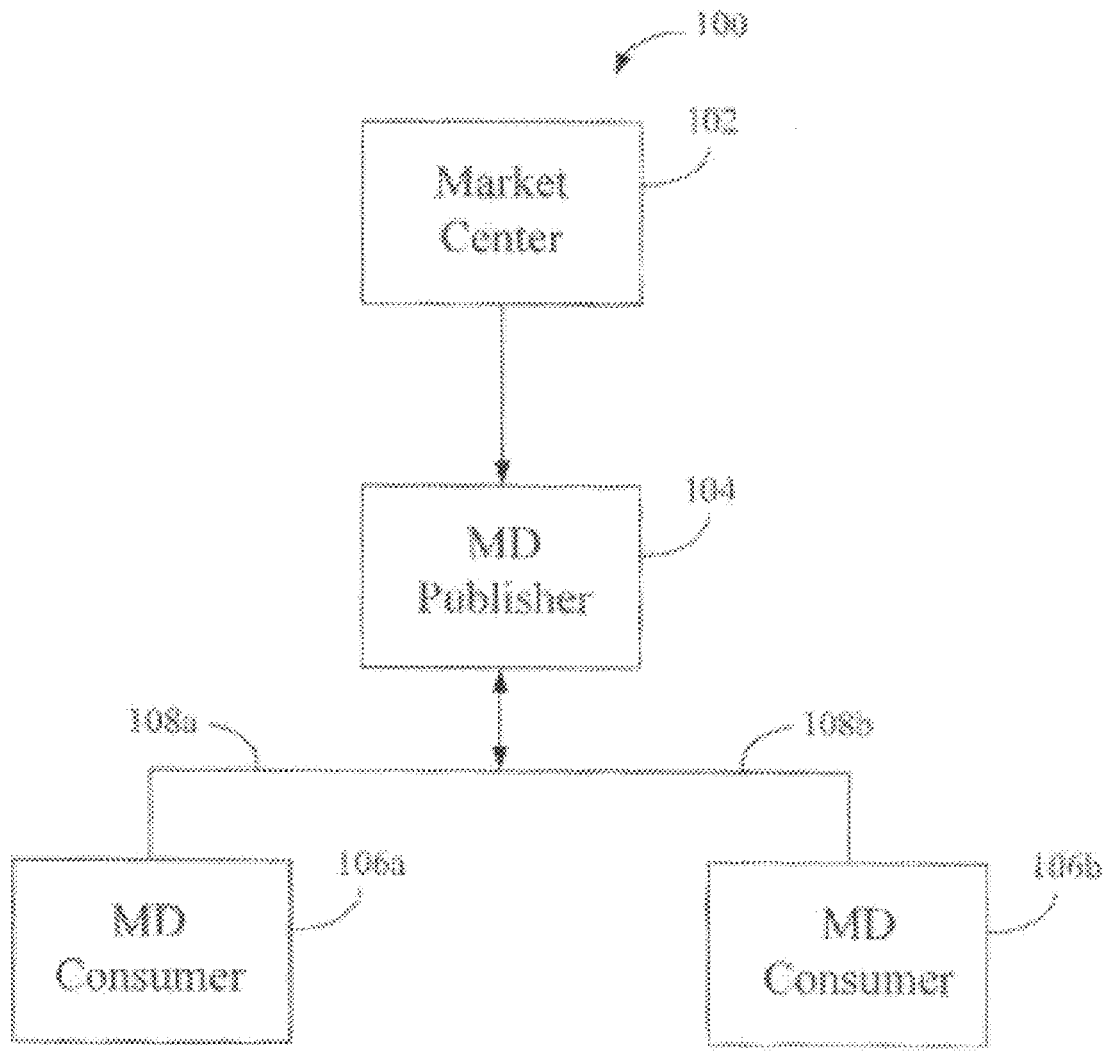
FIG. 1 is a block diagram of a computer-implemented apparatus in which market data for tradable financial instruments may be published to a trader client device.

Turning now to the drawings wherein like reference characters indicate like or similar parts throughout, FIG. 1 shows a computer-implemented apparatus, or computing system 100, which may be implemented by computer program logic stored in a non-transitory memory and executable by a processor to cause the processor operate as described herein, suitable for publishing market data/information sent by an exchange or other market center 102 or market data source (such as the CME, NYSE, etc.) to a trader client device/market data consumer 106a, 106b. Market data is received by an intermediary network device, such as a market data publisher 104, which may be included as part of a local network having a market data gateway or bridge or other component operable to publish the market data to one or more consumer devices 106a, 106b over a feedback oriented network layer. It will be appreciated that the market data publisher 104, in one embodiment, may be implemented as part of an Exchange or market data source 102, i.e. as part of the mechanism by which the market data is published thereby. Alternatively, the market data publisher is 104 is implemented separate from the data source 102, such as a separate service, such as a premium service provided by a third party over other sources of market data, to which market data consumers may selectively subscribe, such for a one time or periodic fee. In either implementation, the market data publisher 104 may be in communication with multiple exchanges or market data sources 102 for the purpose of delivering their market data to market data consumers 106 in accordance with mechanisms described herein.

As is known in the art, a network layer is a combination of firmware and hardware that facilitates the sending and receiving of data over a physical network of links and switches. For the consumer network layer, it is noted that certain network layer types, such as a TCP network layer, described in more detail below, have a built-in ability to enable a slow consumer to provide feedback to a fast data producer at the link level. The present invention takes advantage of such network layer capability by sending market data to the consumer device 106a, 106b only when the consumer device 106a, 106b is able to process the data while providing only the most recent market data to the consumer device 106a, 106b, as more fully described below.

In one embodiment, the market data publisher 104 may be implemented in a network interface controller ("NIC") so as to receive, process and publish the market data as close to a network connection/interface as possible, minimizing any intervening hardware and software components and the associated latency introduced thereby. In particular, the market data publisher 104 may be implemented in a "Smart NIC" which incorporates a field programmable gate array ("FPGA") or other programmable logic to provide processing capability to be collocated, such as via a custom interface, or otherwise closely interconnected with networking equipment, such as a router or switch, e.g. via a backplane thereof. This would allow for access to incoming market data as quickly as possible and avoid the latency introduced, not only by having to route the transaction over conventional networking media, but also by the communications protocols, e.g. Transport Control Protocol ("TCP"), used to perform that routing. One exemplary implementation is referred to as a "Smart Network Interface Controller" or "SmartNIC" which is a device which typically brings together high-speed network interfaces, a PCIe host interface, memory and an FPGA. The FPGA implements the NIC controller, acting as the bridge between the host computer and the network at the "physical layer" and allows user-designed custom processing logic to be integrated directly into the data path. This may allow a smart NIC to function as a programmable market data publishing platform under the supervision of a host CPU. Under the Open System Interconnection ("OSI") model, which is a conceptual model that characterizes and standardizes the internal functions of a communication system by partitioning it into abstraction layers, the physical abstraction layer defines electrical and physical specifications for devices. In particular, it defines the relationship between a device and a transmission medium, such as a copper or fiber optical cable. This includes the layout of pins, voltages, line impedance, cable specifications, signal timing, hubs, repeaters, network adapters, host bus adapters (HBA used in storage area networks) and more. The major functions and services performed by the physical layer include: establishment and termination of a connection to a communications medium; participation in the process whereby the communication resources are effectively shared among multiple users, for example, contention resolution and flow control; and modulation or conversion between the representation of digital data in user equipment and the corresponding signals transmitted over a communications channel, these signals operating over the physical cabling (such as copper and optical fiber) or over a radio link. As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" will refer to data processing functionality that is deployed on a GPP. The term "firmware" will refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together"—somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

In one embodiment, the disclosed market data publisher 104 is integrated with the TCP implementation on the host computer system, not only to receive incoming market data from the market data center 102 as quickly as possible but to have access to market data messages which are queued up for transmission to the client device 106 such that data that has yet to be transmitted may be updated with the most current market data as will be described. In particular, in one implementation the market data publisher 104 may be integrated with a customized version of the TCP protocol stack and may be further implemented within the NIC to perform the functions described below.

The amount of market data sent by a market center 102 will depend on many dynamics. Market data can be subscribed to on a number of levels with each level representing a different type and/or amount of data to be sent. In addition, market activity can fluctuate significantly for different tradable instruments. Accordingly, it will be appreciated that market data is ephemeral in nature. As markets can rapidly change due to the continuous trading activity of the market participants, as soon as market data is generated, representative of the state of the market at the time of its generation, its status as an accurate representation of the market, and therefore its value to a recipient thereof, may be time-limited, i.e. based on the amount of time elapsed between its generation and its receipt by the recipient, as the market may change soon thereafter rendering the previously generated market data inaccurate and superseded by later generated market data. It will be appreciated that at any given time numerous updates to the same market data may be "in flight" or otherwise "on the wire". When market data volumes begin flowing at rates that exceed what can be delivered to and consumed by the client device 106a, 106b, internal message queues, which buffer the data until it can be transmitted, and may store the data, e.g. for retransmission, until confirmation of receipt by the recipient is received, can grow to the point where the market data is unusable due to its latency. In worst case scenarios, market data can actually backlog to the point that there is a failure in the ability to deliver any useful data to the consumer device 106a, 106b.

In one embodiment, market data publishing may involve compressing the market data into a format that is more easily moved to and used by the consumer device 106a, 106b. The market data may be serialized at the publisher 104 and sent out over a connection 108a, 108b to the consumer device 106a, 106b where it is then de-serialized for processing by the consumer device 106a, 106b. It will be appreciated that the market data publisher 104 may also act as a relay to retransmit incoming market data in the form it is received, or as will be described, only the most recent/current updates thereto, to the subscribing client devices 106 as the market data is received, subject to, as will be described, the receiving device's 106 ability to process the data.

Unlike prior approaches that publish market data at a hard-coded fixed rate or as the data is received regardless of whether the consumer device 106a, 106b is capable of processing the data at the rate of publishing, the apparatus 100 operates to ensure that market data sent by the market center 102 does not overwhelm the ability of the consumer device 106a, 106b to use/process that data. This is accomplished by configuring the apparatus 100 to publish the market data to the consumer device 106a, 106b at a rate commensurate with the rate at which the consumer device 106a, 106b can process the data.

The capacity of the network between the client device 106a, 106b and the market data publishing server (or other component of the publisher 104 responsible for publishing market data to the client device 106a, 106b) and/or the processing capacity of the client device 106a, 106b may determine the rate at which published market data is processed or utilized by the client device 106a, 106b and, accordingly, the rate at which the market data will be published. As the demands on, and therefore the capacity of, the network and/or client device 106a, 106b change, the rate at which market data is published will increase or decrease accordingly.

Thus, the rate at which market data is published to the client device 106a, 106b is dynamic and adaptive and can be said to "adjust on the fly." This is accomplished by configuring the market data publisher 104 and its connection 108a, 108b to each consumer device 106a, 106b in a way that allows the publisher 104 to know when each of the consumer devices 106a, 106b has processed the most recent market data it has received and is ready to receive new market data. This mechanism is performed at the network hardware level at high speed to prevent it from becoming a bottleneck to the publishing process. As described above this mechanism may be implemented in a NIC and may be further implemented in conjunction with the network routing layer implementation.

For example, in one embodiment, connections 108a, 108b are point-to-point TCP (Transmission Control Protocol) connections, implemented by TCP functionality, also referred to as a TCP stack, at both the transmitting and receiving devices, which have a built-in acknowledgment feature that enables the publisher 104 to receive an acknowledgment, or ACK, to indicate when the consumer device 106a, 106b is ready to receive new market data. In particular, the TCP stack provides a buffer memory where data messages are queued for transmission over the network 108. Separate buffer memories may be provided for each device 106 to which data is to be communicated. In one embodiment, as will be described, when an application, such as the market data publisher 104, is ready to transmit data, it stores the data in the TCP buffer memory, assuming, as will be described, the TCP buffer memory has available capacity. Meanwhile, and independent of the market data publisher 104, the TCP mechanism implements the TCP protocol which, at a high level, sequentially transmits a variable portion of TCP buffer contents and then awaits receipt of a confirmation/acknowledgment from the recipient confirming receipt of the transmitted data. The amount of data which can be sent in any one transmission or otherwise without having received an acknowledgment is referred to as a "window" and this amount may vary. The window may be thought of as a sliding view into the TCP buffer that indicates the next sequence of data to be transmitted. As acknowledgements are received the window slides forward within the buffer indicating the next sequence of data to be sent. Initially when the TCP connection is just been setup and no data has been sent by the publisher, the TCP buffer is empty and the window points to a blank view of the buffer which, per the TCP protocol, implicitly indicates that the receiver is able to receive new data equal to the window size. Generally this acknowledgment confirms the receipt of the last successfully received data of the sequentially transmitted data which, under the protocol, confirms receipt of that data and all of the data which sequentially preceded it. Upon receipt of this acknowledgment, the acknowledged data may then be cleared from the TCP buffer, making room for new data to be transmitted, and the TCP logic moves on to transmit the next sequential portion of data from the TCP buffer, which may include any or all of the previously transmitted but unacknowledged data. Accordingly, the acknowledgment serves to indicate how much of the previously transmitted data was successfully received. That is, where acknowledgment of receipt of previously transmitted data is not received, that data may be retransmitted, such as after a configurable period of time has elapsed. The TCP protocol may provide for multiple attempts to successfully transmit data before ceasing further attempts. Upon successful transmission of data, the TCP protocol may provide for increasing the amount of data sent in a given transmission, i.e. by increasing the size of the window. As described herein, the receipt of acknowledgment confirming receipt of previously transmitted data is treated as a signal that the recipient is ready to receive and process more data. Conversely, the failure to receive such an acknowledgement within a predetermined interval of time is treated as an indication that the receiving device is not capable of receiving more data, e.g. because the receiving device, or the intervening network, is overloaded, etc. When this happens, the size of the sliding window may be reduced by a predetermined factor in order to reduce the data rate of the publisher. If the window size reduces to zero, the publisher stops sending any more data on the wire unless/until acknowledgements are received from the receiving device and the window size can be increased. The TCP buffer memory capacity may be configurable and may be same or a different size for each receiving device 106, e.g. 64 K bytes. In one embodiment, the buffer memory is sized so as to contain data representative of one order book. Alternatively, the buffer memory may be sized to contain data representative of multiple order books, multiple market data messages, etc. Market data messages may be on the order of 16-600 bytes in size. In embodiments, where the market data publisher 104 and TCP protocol share the buffer memory, the buffer memory may be sized accordingly dependent upon the implementation and the anticipated rate of receiving market data from the sources thereof and the anticipated rate at which the consumer devices can receive and process it. In one embodiment, the buffer memory and/or window size is dynamic and changes based on conditions, such as rate of receipt of market data and/or rate of transmission to the consumer devices 106.

Figure 2:
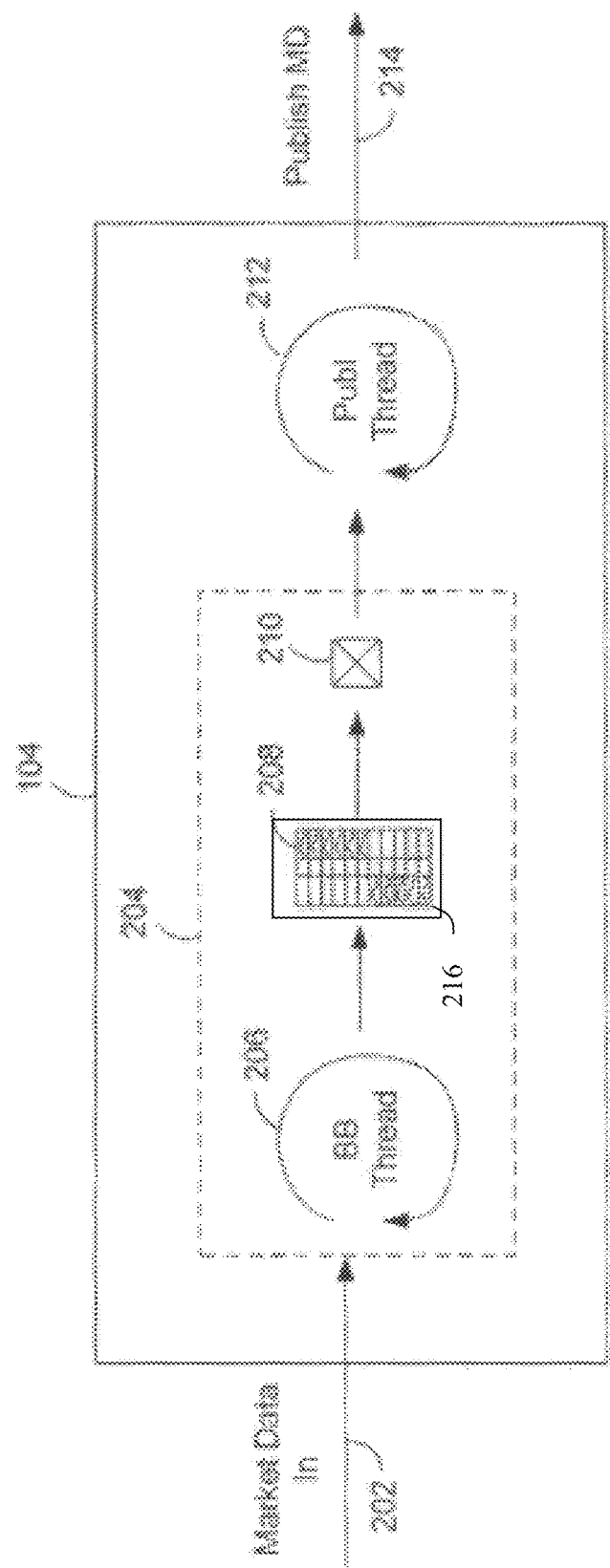
FIG. 2 is a block diagram of an adaptive market information publisher depicting bookbuilder and publisher threads of operation.

The publisher 104 is further illustrated in FIG. 2 where publisher 104 receives market data from the market center or other data source 102 (FIG. 1) at input 202. As described above, the publisher 104 may be coupled with multiple market centers/data sources 102 and process the data received therefrom as described. Alternatively, there may be one market data publisher 104 implemented for each market center/data source 102. In one embodiment, publisher 104 utilizes two threads of operation—a book builder thread 206 (shown as part of a book builder 204) which places market data for a particular financial instrument into a market book 208 or other data structure, which may be implemented in a memory/buffer 216 operative to store the data prior to transmission, representing offers to sell and offers to buy the financial instrument at a plurality of prices, and a publisher thread 212 which publishes, or otherwise causes the transmission of, market data (preferably the entire book but may also be just a portion thereof) at output line 214. As described above, alternatively, the incoming market data messages may be stored in the memory/buffer 216 for transmission in the form in which they are received, such as individual messages, in the Financial Information Exchange ("FIX") message format, etc. As will be described, wherein the incoming market data is stored directly into the TCP transmission buffer, the publisher thread 212 may be implemented by the TCP protocol transmission process. In embodiments utilizing a separate TCP transmission buffer, the TCP protocol stack (not shown) and TCP transmission buffer (not shown) are coupled between the publisher thread 212 and the output 214 wherein, as described elsewhere herein, the publisher thread 212 copies the market data from the memory 216 to the TCP transmission buffer (not shown) for transmission by the TCP protocol via the output 214.

In operation, when the publisher 104 receives a market data update at line 202, the market data update is added to the book 208, or otherwise stored in the memory 216, by the book builder thread 206 and a "new data" flag or other form of indicator 210 may be set to indicate that new market data is available for publishing/transmission to the client device 106a, 106b. It will be appreciated that there may be other methods of signaling the storing of new data, such as the incrementing of a counter, allocation of a pointer, allocation of a portion of the memory 216, etc. However, the market data update is not necessarily immediately published to the client device 106a, 106b (though it could be by way of the operation of described herein). Nor is the market data update published to the client device 106a, 106b after a set time interval. Rather, the new market data update is only published to client device 106a, 106b when the client device 106a, 106b is ready to process the update. When a client device 106a, 106b is ready to receive new data as indicated by available space in the window, i.e. indicating that previously transmitted data has been successfully received, publisher 104 will check flag 210. If flag 210 is set, the market data, e.g. the book 208, stored in the memory 216 is serialized to the output line 214 by the publisher thread 212 where it is sent to the client device 106a, 106b for processing, e.g., in one embodiment, moved to the TCP transmission buffer to be queued for transmission and in an alternate embodiment, actually transmitted to the client device 105a, 106b. Access to the stored market data or book 208, or to portions thereof, such as portions which have been transmitted but acknowledgment of receipt has not yet been received, may be locked at any given time to ensure that only one of either the book builder thread 206 or the publisher thread 212 can access the stored market data or book 208, or portion thereof, at any point in time. It will be appreciated that other forms of data coherency protection, e.g. mechanisms to ensure stale or otherwise invalid data does not supersede more recent data, may be implemented, including locking and/or data invalidation mechanisms. In embodiments where the TCP transmission buffer and the market data memory 216 are separate, the publisher thread 212 may effectively determine that the TCP buffer has capacity for data, e.g. because previously transmitted and acknowledged data has been removed therefrom. However, the TCP buffer may still contain yet to be transmitted data which must still be transmitted ahead of any new data moved into the buffer by the publisher thread 212. In this embodiment, although data added to the TCP buffer may still have to wait to be transmitted by the TCP protocol, such data may be considered to have been transmitted as it is no longer under the control of the book builder thread 206 for the purpose applying any subsequently received updates. As described elsewhere, the size of the TCP buffer may be set so as to ensure that any data stored in the buffer can be sent in a single transmission, thereby minimizing the chance that data added to the buffer will have to wait. In the embodiment featuring a combined market data memory and TCP buffer, data may be considered transmitted when it is actually communicated over the network and, even then, until receipt is acknowledged, as will be described below, subsequent updates may still be able to be applied to the data, such as if the TCP protocol determines that retransmission is necessary.

In the event a subsequent market data update is received by the publisher 104 while flag 210 is set or otherwise while data remains in the memory 216 awaiting transmission, it is preferable that the subsequent market data update replace the corresponding market data, identified, for example, by the data indicating the particular financial instrument such as the ticker symbol or other identifier, that was contained in the memory 216, e.g. the book 208, immediately prior to receiving the subsequent market data update. This may be referred to as "coalescing" the data. In one embodiment, the memory 216 storing the market data may comprise a content addressable memory ("CAM") or other data structure allowing rapid location and updating of previously stored data. This ensures that when the client device 106a, 106b is ready to receive new market data, the memory 216, i.e. the market data or book 208 that is sent to the client device 106a, 106b, will contain only the most recent market data. Alternatively, new market data updates may be added to the book 208 without eliminating old market data.

In one embodiment, the memory 216 in which received market data is stored, such as in the form of an order book 208, and the TCP buffer memory are the same memory eliminating the publisher thread 212 (or otherwise combining the function thereof with the TCP transmission protocol) and the need to move the data as it is determined that the receiving device 106 is ready. In this embodiment, as new market data is received, it is written into the memory 216 in a form ready for transmission by the TCP protocol. If the received data is an update to previously received stored data which has not yet been transmitted, the received data is stored in place of the previously received data so that, upon transmission, the most up to date data is transmitted as described herein. In one embodiment, if previously received and stored data has already been transmitted but acknowledgment of its receipt by the recipient has not yet been received, newly received updated data is stored in the memory buffer 216 and the previously received data is flagged to indicate that if the previously received data should have to be retransmitted by the TCP protocol, the newly received data should be sent instead. This may be accomplished by associating a flag, indicative of the data's validity, and/or pointer, i.e. to the location in the memory of the newly received data, with the previously transmitted data to indicate that the more up to date data is available and should be used if retransmission is necessary. It will be appreciated that, as described above, this combined buffer memory 216 should be of a capacity capable of storing sufficient data in view of the anticipated volume of data expected to be received and the expected capacity of the consuming devices 106 and that this capacity is implementation dependent.

Figure 3:
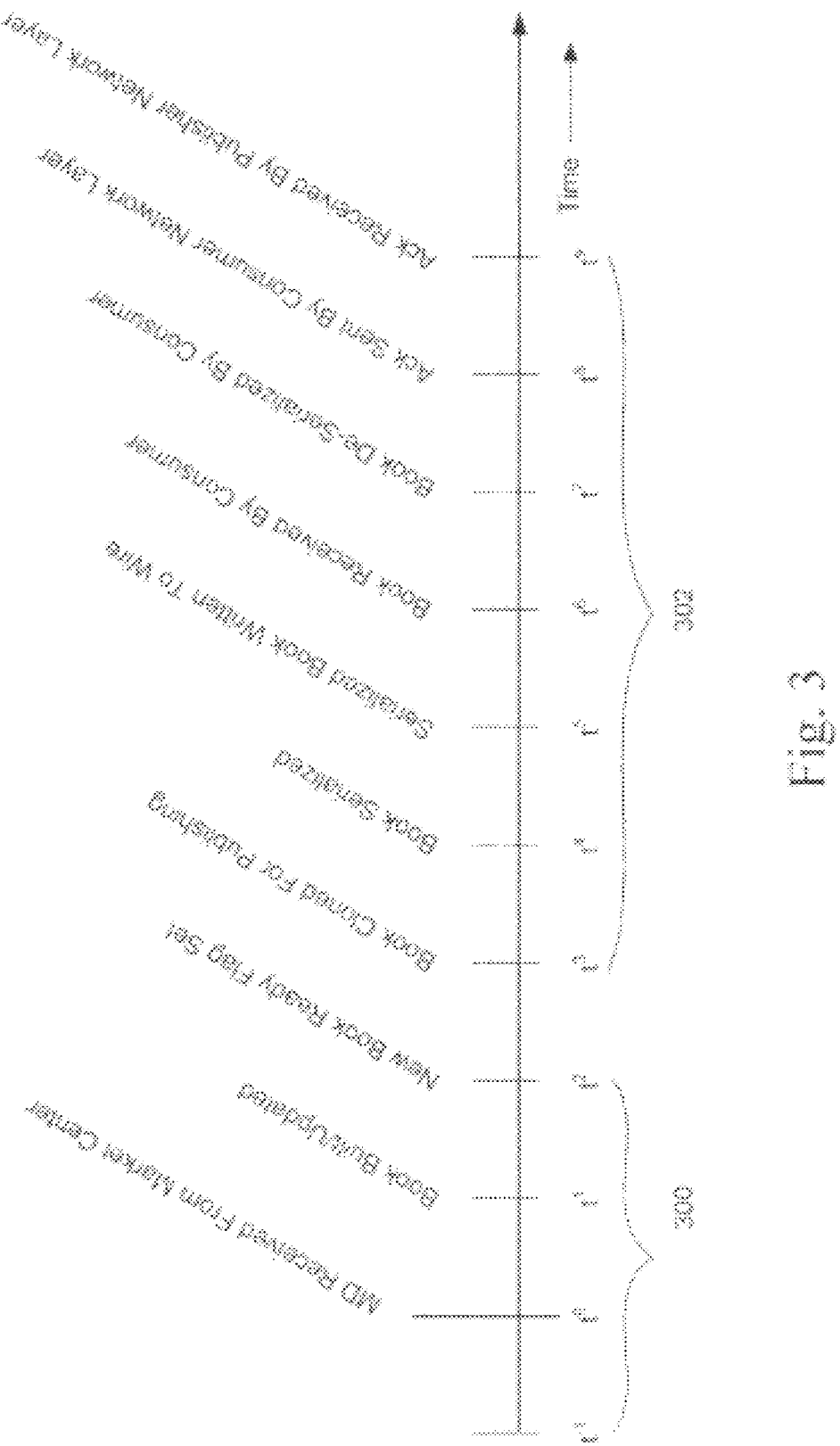
FIG. 3 is a timing diagram representing an embodiment of the bookbuilder and publisher sequence of operations.

FIG. 3 shows a generalized timeline for publishing market data for a financial instrument according to an exemplary sequence of events according to one embodiment, where the time period $t_0$ through $t_2$ 300 represents a process being carried out by the book builder 204 of FIG. 2 and the time period $t_3$ through $t_9$ 302 represents a process being carried out by the publisher thread 212. By time $t_0$, market data is received from the exchange or other market center and the received market data is used to build and update a market book for the financial instrument by time $t_1$. After the market data is added to the book or otherwise stored in the memory 216, a market data ready flag is set at time $t_2$ to indicate that new market data is ready to be published. If new market data is received after the flag is set, process 300 is repeated with the new market update replacing the corresponding existing market data in the book/memory.

By time $t_3$, the client device is ready to receive additional market data, e.g. acknowledgment of previously transmitted market data has been received and/or the TCP buffer has capacity for additional data, and the market data or book is cloned for publishing. The market data/book is serialized, e.g. converted to a series of message packets suitable for transmission according to the communications protocol, by time $t_4$ and the serialized data/book is stored in the TCP buffer memory where the TCP protocol causes it to be written to the wire (output line 214 in FIG. 2) by time $t_5$. In an alternate embodiment where the market data is stored directly into the TCP buffer memory, the data/book is transmitted therefrom by the TCP protocol as determined thereby. The data/book is received by the client device by time $t_6$ and de-serialized for use by the client device by time $t_7$. An acknowledgement (ACK) is sent by the client network layer by time $t_8$ to acknowledge receipt and received by the publisher network layer by time $t_9$ to complete the sequence. It will be appreciated that other processes or steps, not shown, may occur. For example, should an acknowledgment of receipt not be received after a elapse of a defined period of time, the data may be retransmitted. Retransmission may occur a defined number of times before it is assumed that the receiving device is unavailable and the system ceases to transmit thereto.

Figure 4A:
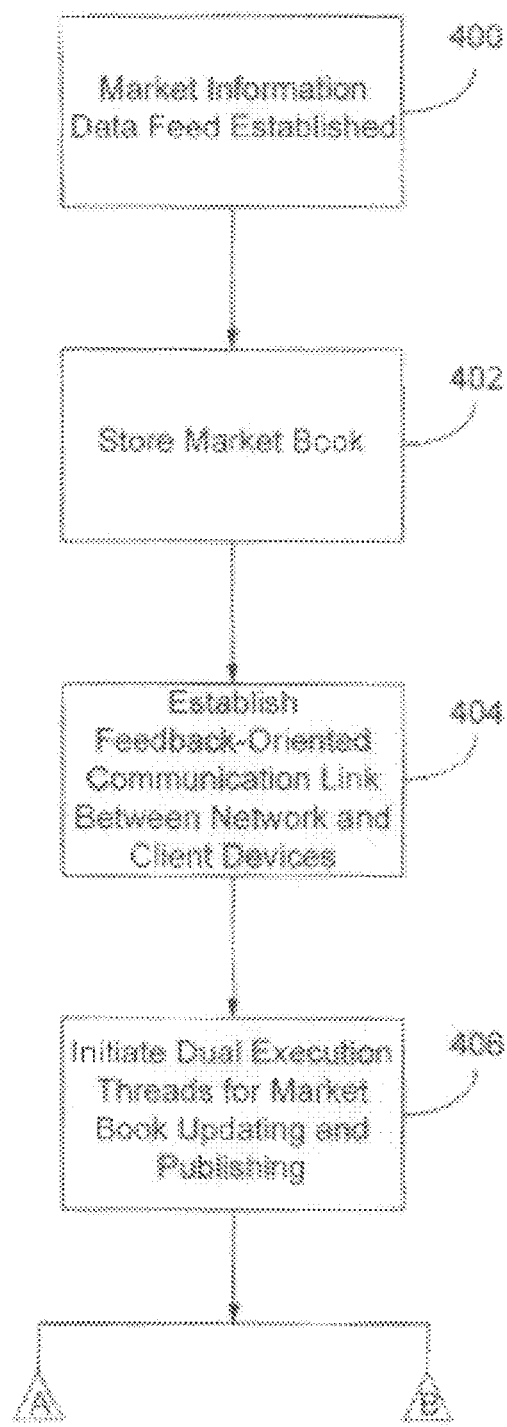
FIGS. 4A-4C, collectively, are a flow diagram of a method for adaptively publishing market information received from a market center to a client device.
Figure 4B:
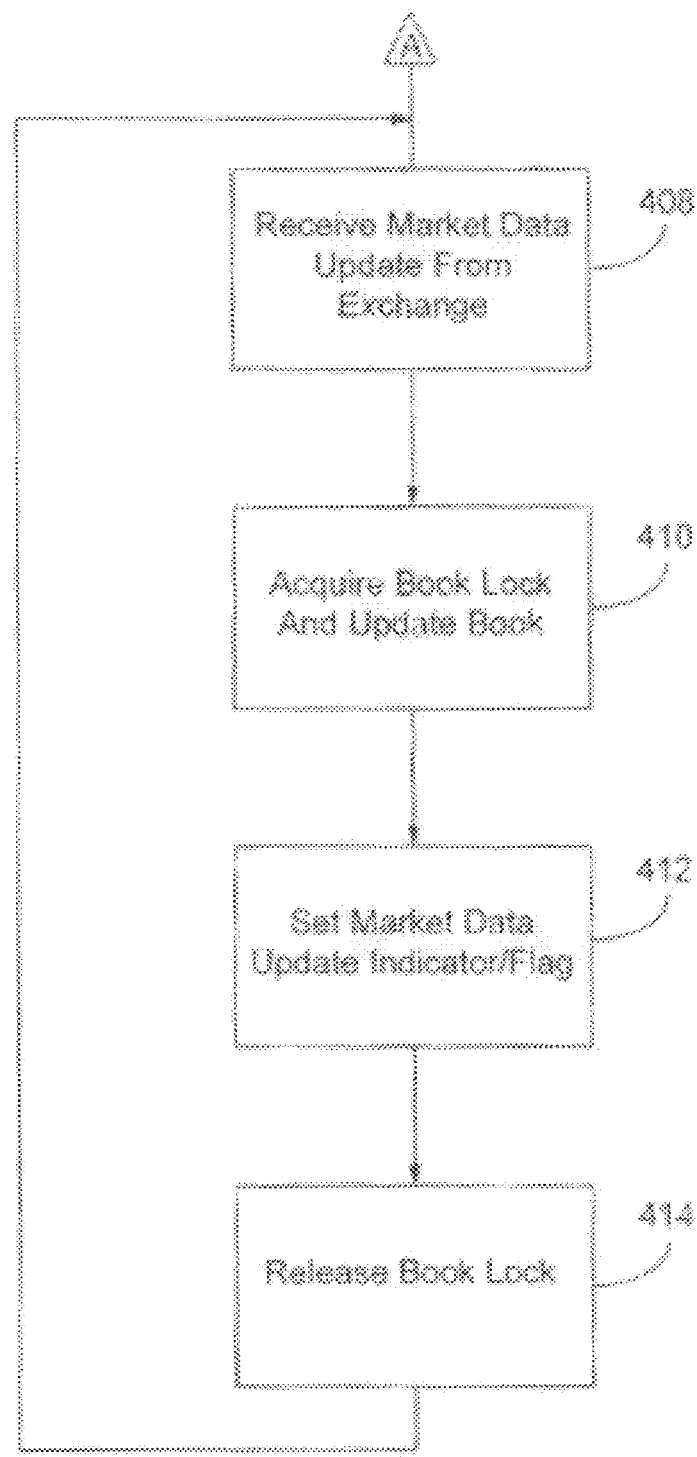
Figure 4C:
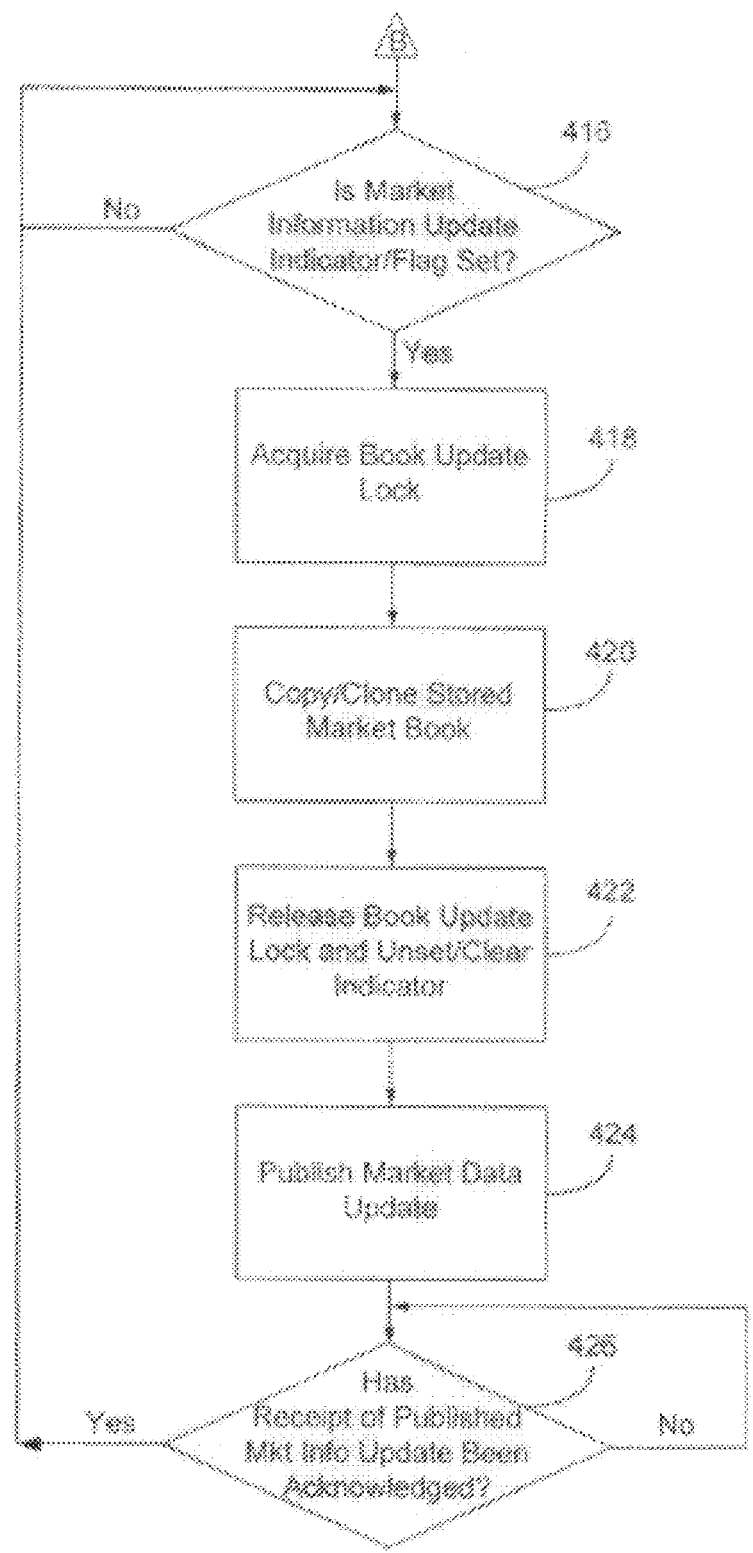

A more detailed flowchart for one embodiment of the market data publishing method and apparatus described herein is shown in FIGS. 4A-C. At block 400, a market information feed (such as a data feed from an exchange) is established. The first market data received upon initiation of the process will be used to build and store a market book 402, or otherwise store the incoming market data messages, within an electronic memory 216 that is preferably internal to the computing system but, as described above may be part of the NIC and may further be combined with the TCP buffer memory. A feedback oriented electronic communication link (such as Transmission Control Protocol, or TCP link) is established between a network device configured to receive and publish the market data and one or more client devices 404. The electronic communication link is configured to provide a feedback signal or other indication to the network device to inform the network device when a client device is ready to receive market information, i.e. by transmitting an acknowledgment of receipt of previously transmitted data. Dual threads of execution—one for market book updating and one for client device publishing—are initiated at block 406.

For the market book updating/book building thread, a market data update is received from the exchange or market center at block 408. The memory/market book, or portion thereof, is then locked to prevent publishing during updating of the book while the book is updated at block 410, and a market data update indicator/flag is set at block 412. Once the market book has been updated, the book lock is released 414 and the book building/updating process returns to block 408 and awaits receipt of the next market data update.

For the client device publishing thread, the process continually checks to see whether new/updated/untransmitted market data is in the memory 216, e.g. by checking whether the market information update indicator/flag has been set 416. When it is determined that new/updated/untransmitted data is available, e.g. that the flag is set, the memory/book, or relevant portion thereof, is locked 418 to prevent the book building thread from updating the book while it is in the process of being published. At block 420, the stored market book is copied/cloned, i.e. to the TCP buffer memory, and the book lock is released at block 422 to enable the book builder to again make updates to the book as new market data is received from the market center. The market data update/cloned book is published, i.e. transmitted from the TCP buffer by the TCP protocol, at block 424 and the process then waits at block 426 for a network layer ACK to indicate that the client device has processed the new book and is ready to receive new market data updates. When the ACK is received, the process returns to block 416.

In one embodiment, there may be one market data publisher 104 for each receiving device 106 allowing the system to adapt to each device's 106 capabilities independent of the other devices 106. In this embodiment, each market data publisher 104 may have its own TCP protocol stack and TCP transmission buffer which may be separate from or combined with the memory 216 of the market data publisher 104 as described above. In an alternative implementation, a single market data publisher 104 may service multiple receiving devices 106 with a one or more, e.g. for each receiving device 106, TCP protocol stack and TCP transmission buffer. In one embodiment, when more than one receiving device 106 is subscribed to the same market data but have different capacities to receive data, marker data publisher 104 may utilize a single memory 216 to store the market data to avoid redundant copies, individual TCP protocol stacks and TCP transmission buffers so as to adapt to the individual capacities of the receiving devices 106, and logic to keep track of which data, or updates thereto, have been successfully transmitted to each device 106.

In one embodiment, the disclosed market data publisher 104 may be implemented at multiple locations/nodes along a network path between a market data source and the end consumer device 106, such as in conjunction with the network infrastructure components, e.g. routers and switches, which implement the network. Each downstream deployment of the market data publisher 104 may appear to the upstream deployment as simply a consuming device 106. Accordingly, at each node, market data may be coalesced and updated, as described above, when downstream network congestion inhibits the transmission thereof. This may alleviate the burden of storing market data on any one market data publisher 104 along the network path as well as accommodate for network congestion at multiple points within a network infrastructure.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

I claim:

1. A computer implemented method for transmitting market data relating to a financial instrument to a client device over an electronic network, the method comprising:

receiving, by a network device, the market data relating to the financial instrument from a financial market center;

storing, by the network device comprising a memory, the received market data in the memory prior to transmission of the received market data to the client device over the electronic network;

determining, by the network device, if the received market data is an update to previously received market data which is stored in the memory and has not yet been transmitted to the client device, wherein if the received market data is determined to be an update to the previously received market data which is stored in the memory and has not yet been transmitted to the client device, replacing the previously received market data stored in the memory with the received market data, and if the received market data is determined not to be an update to the previously received market data which is stored in the memory and has not yet been transmitted to the client device, storing the received market data in the memory; and transmitting, by the network device via the electronic network, all of the stored received market data to the client device only upon determination that the client device has acknowledged receipt of previously received market data that was previously transmitted to the client device regardless of whether or not the received market data is identical to the previously received market data that was previously transmitted to the client device and acknowledged thereby as having been received, wherein the electronic network utilizes a Transmission Control Protocol (TCP) that provides a feedback signal in a form of a network layer acknowledgment (ACK) which the client device utilizes to acknowledge receipt of the previously received market data stored in the memory that was previously transmitted to the client device.

2. The computer implemented method of claim 1, wherein the TCP includes a buffer from which the received market data is transmitted, the memory comprising the buffer.

3. The computer implemented method of claim 1, wherein the storing of the received market data in the memory further comprises setting an indicator indicative thereof, and further wherein the determining evaluates the indicator and determines that the received market data is an update to the previously received market data which is stored in the memory and has not yet been transmitted to the client device when the indicator is determined to be set and determines that the received market data is not an update to the previously received market data which is stored in the memory and has not yet been transmitted to the client device when the indicator is determined not to be set.

4. The computer implemented method of claim 1, further comprising:
determining if the received market data is an update to the previously received market data which is stored in the memory and has been transmitted to the client device but for which acknowledgment of receipt by the client device has not yet been received, and based thereon, transmitting the updated market data in place of the previously transmitted data the network device retransmits the previously received market data which is stored in the memory and has been transmitted to the client device.

5. The computer implemented method of claim 1, wherein the received market data is stored in the memory in a form of a market book representing offers to sell and offers to buy the financial instrument at a plurality of prices.

6. The computer implemented method of claim 1, wherein the received market data comprises data representative of a portion of a market book representing offers to sell and offers to buy the financial instrument at a plurality of prices.

7. The computer implemented method of claim 1, wherein the received market data comprises data indicative of a change in a market for the financial instrument.

8. The computer implemented method of claim 1, wherein the transmitting further comprises copying the received market data to a buffer, separate from the memory, from which the copied received market data is transmitted to the client device.

9. The computer implemented method of claim 1, wherein the received market data is transmitted to the client device from the memory.

10. The computer implemented method of claim 1, wherein the receiving, determining, replacing, storing and transmitting are performed by a network interface controller.

11. The computer implemented method of claim 10, wherein the network interface controller further implements a TCP stack.

12. A system for transmitting market data relating to a financial instrument to a client device over an electronic network, the system comprising:
a processor and a first memory coupled therewith;
computer program logic stored in the first memory and executable by the processor, wherein the processor is configured to:
receive, from a financial market center, the market data relating to the financial instrument;
store the received market data in a second memory prior to transmission of the received market data to the client device over the electronic network;
determine if the received market data is an update to previously received market data which is stored in the second memory and has not yet been transmitted to the client device, wherein if the received market data is determined to be an update to the previously received market data which is stored in the second memory and has not yet been transmitted to the client device, replace the previously received market data stored in the second memory with the received market data, and if the received market data is determined not to be an update to the previously received market data which is stored in the second memory and has not yet been transmitted to the client device, store the received market data in the second memory; and
transmit all of the stored received market data to the client device only upon determination that the client device has acknowledged receipt of previously received market data that was previously transmitted to the client device regardless of whether or not the received market data is identical to the previously received market data that was previously transmitted to the client device and acknowledged thereby as having been received, wherein the electronic network utilizes a Transmission Control Protocol (TCP) that provides a feedback signal in a form of a network layer acknowledgment (ACK) which the client device utilizes to acknowledge receipt of the previously received market data stored in the second memory that was previously transmitted to the client device.

13. A system for transmitting market data relating to a financial instrument, received from a financial market center, to a client device over an electronic network, the system comprising:
a processor and an electronic communication link coupled therewith and implemented via the electronic network and linked with the client device, configured to:
determine when the client device is ready to receive market data based on receipt of an acknowledgment acknowledging receipt by the client device of previously transmitted market data, and
based on determining that the client device is ready to receive market data, provide a feedback signal indicative thereof; and
a market data publisher implemented by the processor, coupled with the electronic communication link, configured to:
receive, from the financial market center, the market data relating to the financial instrument,
store, in a memory comprised by the market data publisher, the received market data prior to transmission of the received market data to the client device over the electronic network, wherein the market data publisher is further operative to determine if the received market data is an update to previously received market data which is stored in the memory and has not yet been transmitted to the client device, wherein if the received market data is determined to be an update to the previously received market data which is stored in the memory and has not yet been transmitted to the client device, replace the previously received market data stored in the memory with the received market data, and if the received market data is determined not to be an update to the previously received market data which is stored in the memory and has not yet been transmitted to the client device, store the received market data in the memory, and
transmit all of the stored received market data to the client device only upon determination that the client device has acknowledged receipt of previously received market data stored in the memory that was previously transmitted to the client device regardless of whether or not the received market data is identical to the previously received market data that was previously transmitted to the client device and acknowledged thereby as having been received, wherein the electronic communications link comprises a Transmission Control Protocol (TCP) that provides a feedback signal in a form of a network layer acknowledgment (ACK) which the client device utilizes to acknowledge receipt of the previously received market data stored in the memory that was previously transmitted to the client device.

14. The system of claim 13, wherein the TCP includes a buffer from which the received market data is transmitted, the memory comprising the buffer.

15. The system of claim 13, wherein the market data publisher is further operative to set an indicator indicative of a storage of received market data in the memory, and further evaluate the indicator to determine that the received market data is an update to the previously received market data which is stored in the memory and has not yet been transmitted to the client device when the indicator is determined to be set and determine that the received market data is not an update to the previously received market data which is stored in the memory and has not yet been transmitted to the client device when the indicator is determined not to be set.

16. The system of claim 13, further wherein the market data publisher is further operative to determine if the received market data is an update to the previously received market data which is stored in the memory and has been transmitted to the client device but for which acknowledgment of receipt by the client device has not yet been received, and based thereon, transmit the updated market data in place of the previously transmitted data the network device retransmits the previously received market data which is stored in the memory and has been transmitted to the client device.

17. The system of claim 13, wherein the received market data is stored in the memory in a form of a market book representing offers to sell and offers to buy the financial instrument at a plurality of prices.

18. The system of claim 13, wherein the received market data comprises data representative of a portion of a market book representing offers to sell and offers to buy the financial instrument at a plurality of prices.

19. The system of claim 13, wherein the received market data comprises data indicative of a change in a market for the financial instrument.

20. The system of claim 13, wherein the market data publisher is further operative to copy the received market data to a buffer, separate from the memory, from which the copied received market data is transmitted to the client device.

21. The system of claim 13, wherein the received market data is transmitted to the client device from the memory.

22. The system of claim 13, wherein the market data publisher is implemented in a network interface controller.

23. The system of claim 22, wherein the network interface controller further implements a TCP stack.

24. A computer implemented system for transmitting market data relating to a financial instrument to a client device over an electronic network, the system comprising:
   means for receiving, by a network device, the market data relating to the financial instrument from a financial center;
   means for storing, by the network device comprising a memory, the received market data prior to transmission of the received market data to the client device over the electronic network;
   means for determining, by the network device, if the received market data is an update to previously received market data which is stored in the memory and has not yet been transmitted to the client device, wherein if the received market data is determined to be an update to the previously received market data which is stored in the memory and has not yet been transmitted to the client device, replacing the previously received market data stored in the memory with the received market data, and if the received market data is determined not to be an update to the previously received market data which is stored in the memory and has not yet been transmitted to the client device, storing the received market data in the memory; and
   means for transmitting, by the network device via the electronic network, all of the stored received market data to the client device only upon determination that the client device has acknowledged receipt of previously received market data stored in the memory that was previously transmitted to the client device regardless of whether or not the received market data is identical to the previously received market data that was previously transmitted to the client device and acknowledged thereby as having been received, wherein the electronic network utilizes a Transmission Control Protocol (TCP) that provides a feedback signal in a form of a network layer acknowledgment (ACK) which the client device utilizes to acknowledge receipt of the previously received market data stored in the memory that was previously transmitted to the client device.

* * * * *